July 23, 1963  B. W. SMITH  3,098,342
ELECTRIC HARNESS ROVING MACHINE AND METHOD
Filed Aug. 23, 1961  4 Sheets-Sheet 1
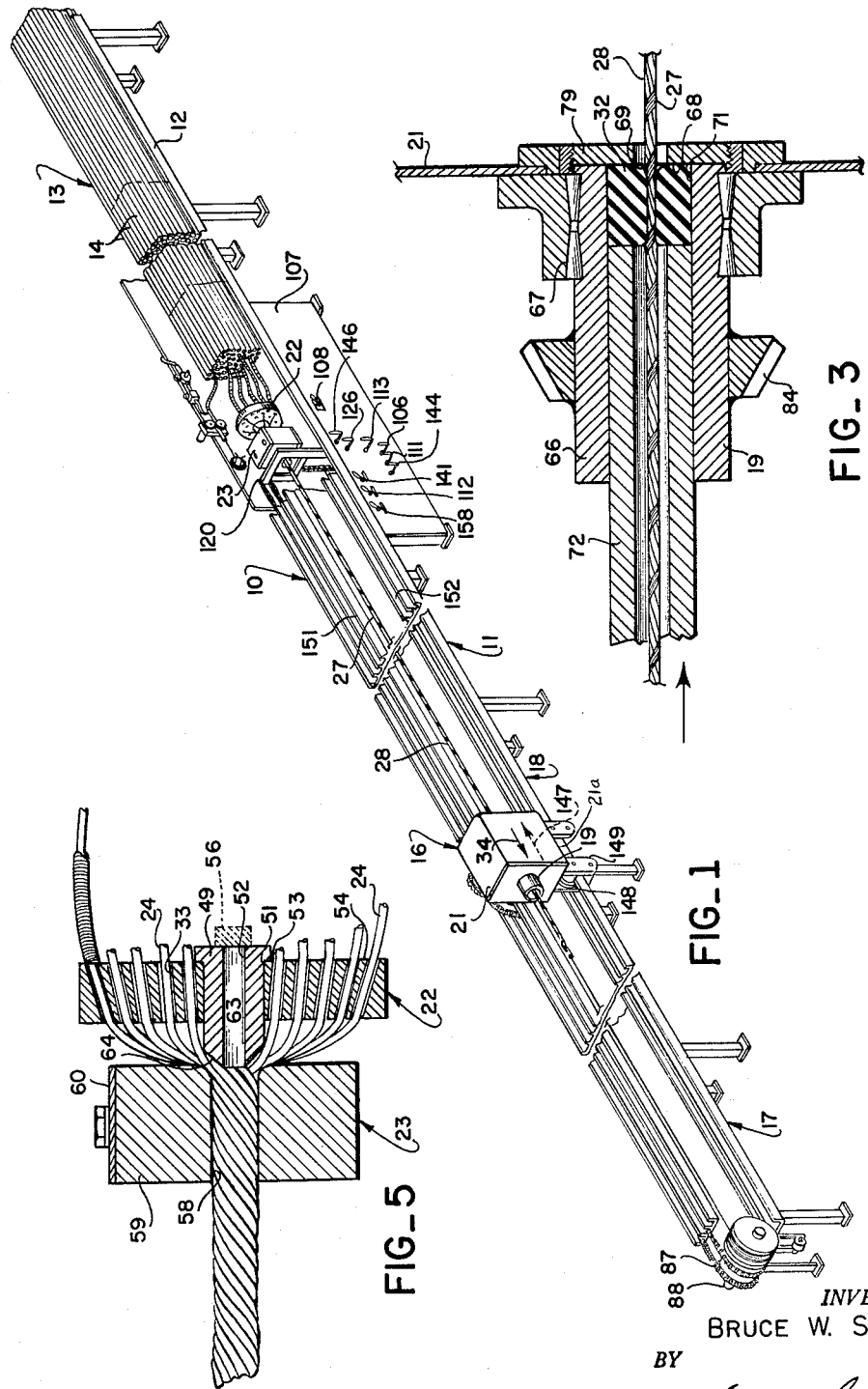
INVENTOR.
BRUCE W. SMITH
BY
George C. Sullivan
Agent July 23, 1963
B. W. SMITH
3,098,342
ELECTRIC HARNESS ROVING MACHINE AND METHOD
Filed Aug. 23, 1961
4 Sheets-Sheet 2
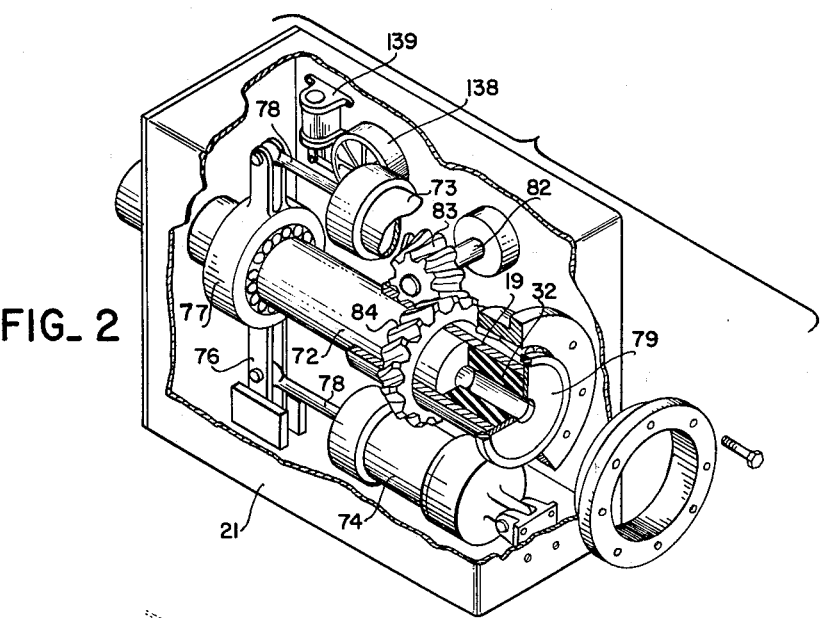
FIG_2
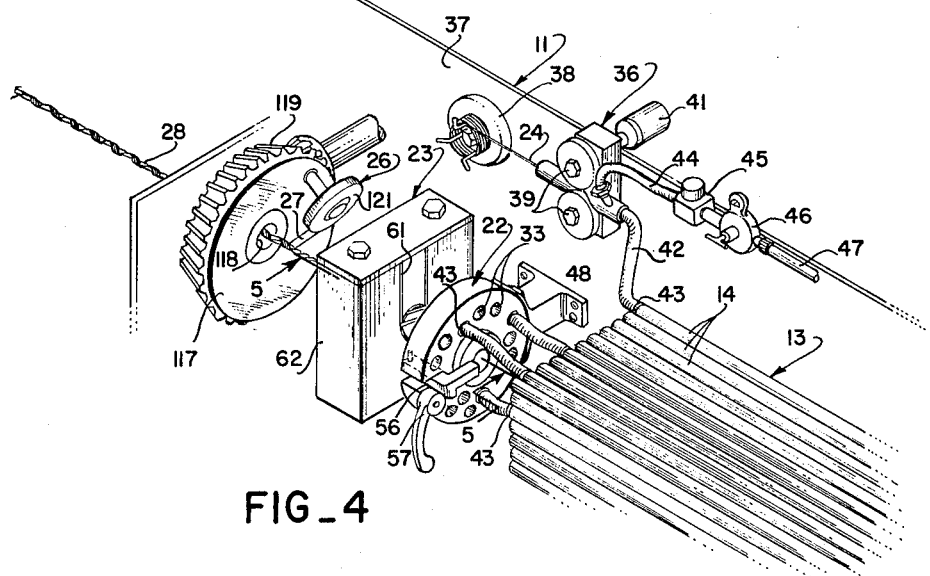
FIG_4
INVENTOR.
BRUCE W. SMITH
BY
Agent

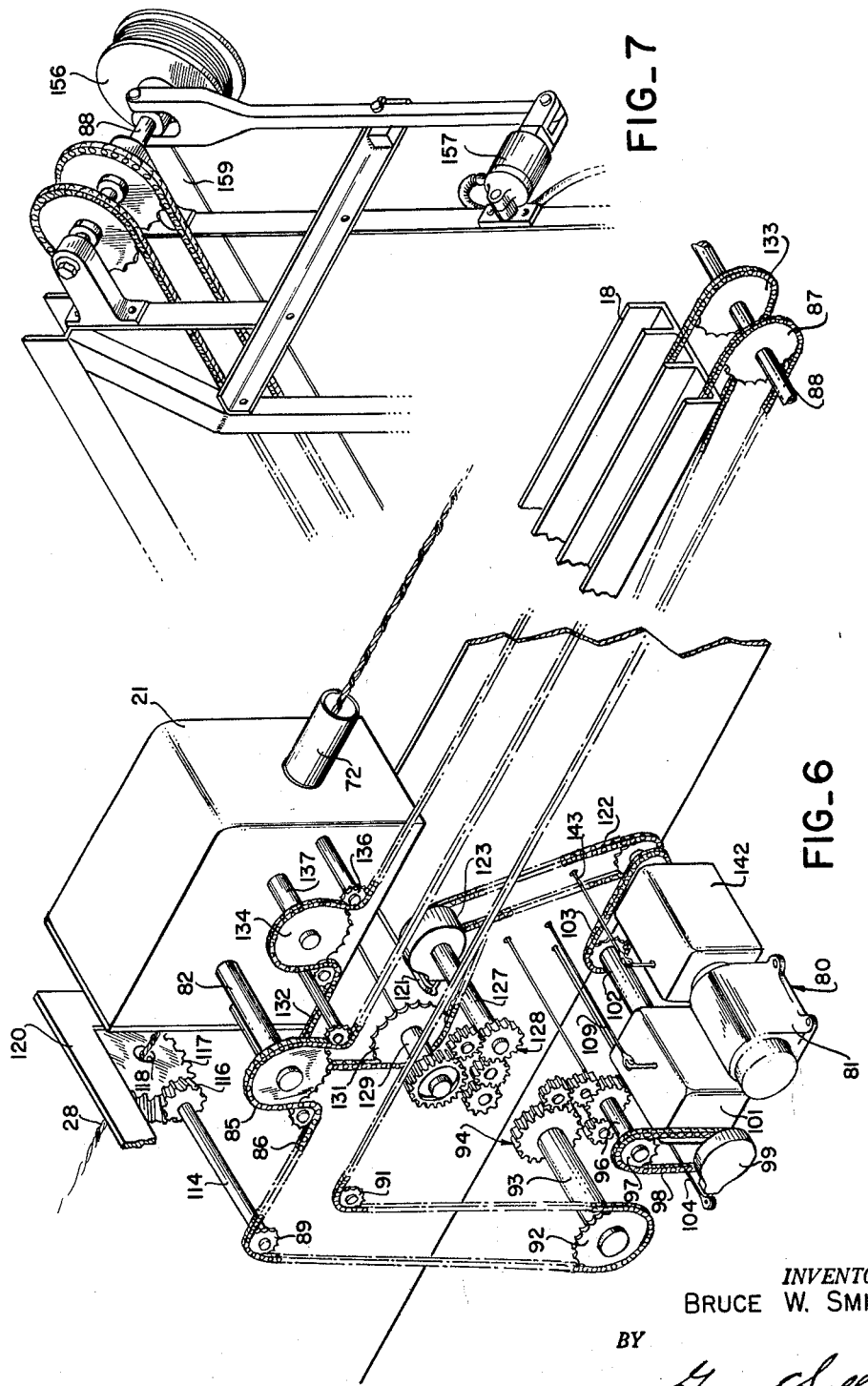

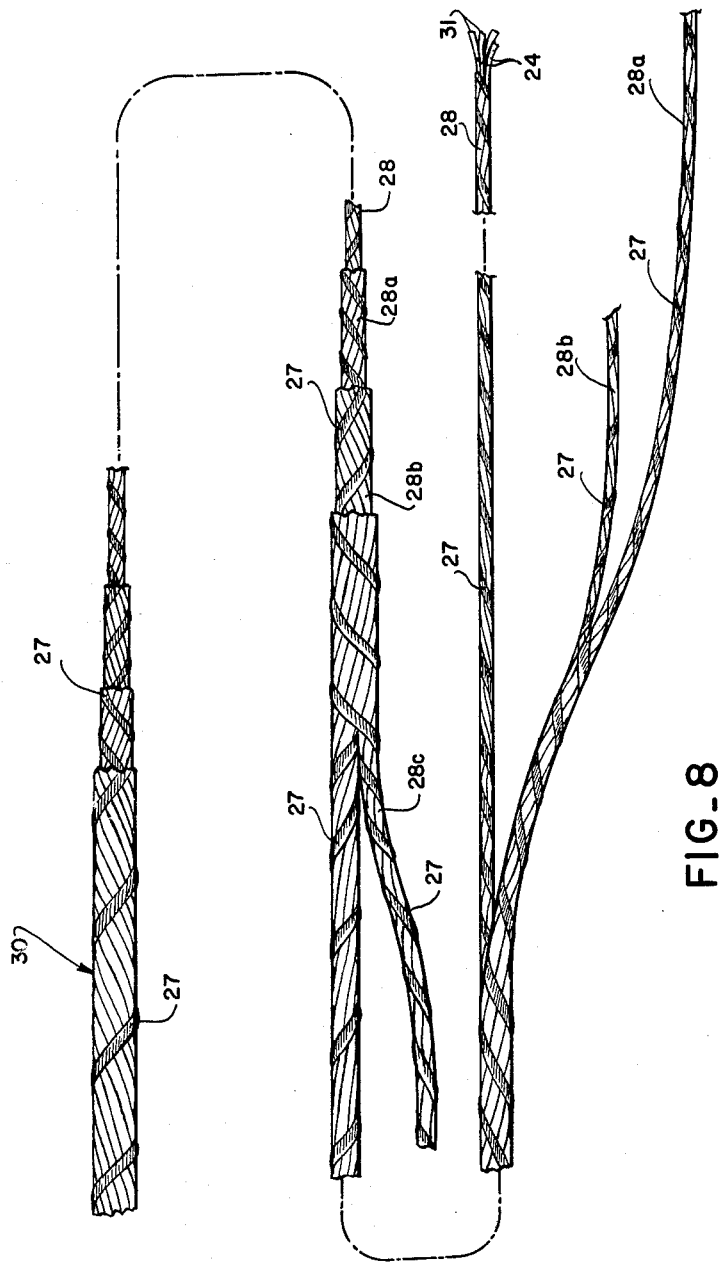

United States Patent Office 3,098,342
Patented July 23, 1963

3,098,342
ELECTRIC HARNESS ROVING MACHINE AND METHOD
Bruce W. Smith, Pacoima, Calif., assignor to Lockheed Aircraft Corporation, Burbank, Calif.
Filed Aug. 23, 1961, Ser. No. 133,400
16 Claims. (Cl. 57—15)

This invention relates to roving machines and more particularly to means and method for an electric harness roving machine in which a plurality of electric wires may be roved so as to fabricate a harness having a selective plurality of break-outs or branches at selective portions of the harness, each having a selective number of plurality of electric wires roved in predetermined lengths.

This invention provides a new and improved machine for roving an electric harness which provides means whereby a plurality of break-outs of predetermined lengths and predetermined plurality of electric wires are individually roved and subsequently roved around previously roved break-outs and finally roved into a single cable, each break-out being of predetermined length and position relative to the main cable so as to provide a neat and efficient harness of predetermined construction. The machine provides means for storing a plurality of wires of predetermined lengths, means whereby selective wires are initially passed through a distributor block, subsequently through a sizing block and then gripped by a reciprocable spindle means which is rotatable to twist the wires into a roving of predetermined outer diameter and length, the roving being automatically wrapped by a tape wrapping mechanism to bind the roving into a unitary construction. Subsequently additional rovings or break-outs may be formed and roved together at successive junctions until finally all of the wires comprising the branches of the harness are roved into a single cable.

The storage means and travelling spindle are located on an elongated frame preferably capable of fabricating a harness having lengths of wires reaching fifty feet or more and comprising as many as a hundred wires. It is to be understood, however, that the machine may be suitably modified so as to handle an unlimited plurality of wires of unlimited length.

The spindle means, gripping and roving the discrete break-outs and ultimately the final cable, is reciprocably mounted on the frame for reciprocal linear movement relative thereto, means being provided for rotating the spindle means in one direction to rove selective wires in one direction which is selectively reversible for roving successive wires in an opposite direction. Drive means is provided for moving the spindle means in a direction to withdraw wires from the storage means and through the distributor means and sizing means. The drive means is reversible for returning the spindle means to a position for gripping a subsequent plurality of wires. The distributor means is adapted for supporting interchangeable core sleeves through which previously roved break-outs may be supported while roving a subsequent plurality of selective wires therearound to ultimately complete the cable having a plurality of break-outs, each having a predetermined number of electric wires of predetermined length.

Previously, fabricating a harness has been a tedious time consuming hand operation wherein each break-out and the entire cable is carefully and painstakingly roved by hand and ultimately bound by tape to bind the wires and the break-outs. Such hand operations are time consuming and thereby very costly and when the over-all length of the harness is relatively long as many comprise wires up to fifty feet in length the cost of roving harnesses by hand is almost prohibitive.

Therefore, it is an object of this invention to provide a new and improved apparatus for more quickly and readily roving a cable having a plurality of break-outs of predetermined length and a plurality of electric wires.

An object of this invention is to provide a new and improved electric harness roving machine which provides means for more tightly and compactly roving each individual break-out and subsequently roving additional wires of subsequent break-outs thereover to ultimately form a single cable having successive break-outs forming cores over which successive pluralities of electric wires are tightly, neatly and readily roved.

Another object of this invention is to provide a new and improved electric harness roving machine which is further usable for pulling the harness and discrete break-outs thereof through sleeving preferably provided for protecting and binding discrete portions of the harness.

A further object of this invention is to provide a distribution block for the improved electric harness roving machine which includes means whereby a previously roved plurality of wires is supported for roving an additional selective plurality of wires therearound.

Still another object of this invention is to provide a new and improved electric harness roving machine having a tape winding mechanism for automatically winding a tape around each roving as it is roved for keeping the roving from untwisting.

A further object of this invention is to provide a variable drive means for driving the spindle means in a desired direction whereby the speed of travel of the spindle means may be varied.

Additionally, an object of this invention is to provide storage means for storing electric wires of predetermined lengths in non-frictional relationship to avoid binding of the wires in the storage means while being twisted during the roving operation.

Yet a further object of this invention is to provide a new and improved electric harness roving machine which is economical to manufacture and capable of mass production and which results in more economical fabrication of an electric harness.

A general object of this invention is to provide a new and improved electric harness roving machine which overcomes disadvantages of prior means and methods heretofore intended to accomplish generally similar purposes.

These and other objects of this invention will be more apparent from the following detailed description, drawings and appended claims.

FIGURE 1 is a foreshortened perspective view, in elevation, of the electric harness roving machine of this invention;

FIGURE 2 is an enlarged perspective view, with parts broken away for greater clarity, of the spindle means of this invention;

FIGURE 3 is a vertical perspective view as taken substantially along the longitudinal center of the spindle means;

FIGURE 4 is a perspective view, in elevation, illustrating a portion of the machine of this invention in greater detail;

FIGURE 5 is a vertical cross-sectional view as taken substantially along the line 5—5 of FIGURE 4;

FIGURE 6 is a perspective view, showing the relationship of drive means to the spindle means of this invention;

FIGURE 7 is a perspective view, of the assembly at the end of the longitudinal frame of the machine of this invention which is useful for applying a sheathing to roved portions of the harness roved on the machine of this invention; and FIGURE 8 is a foreshortened plan view illustrating a typical harness which is capable of being formed on the roving machine of this invention.

Referring in detail to the drawings, there is shown by way of illustration, but not of limitation, an electric harness roving apparatus designed and constructed in accordance with this invention and generally referred to by the numeral 10. The apparatus 10 generally comprises an elongated frame 11 having supported thereon, at one end 12 thereof, a storage means 13 in the form of a bank comprising a plurality of stacked elongated tubular members 14, each capable of supporting an individual wire of predetermined length, and a roving means generally designated by the numeral 16 movably mounted on its opposite end 17 for reciprocal movement on a track 18 formed on the frame. The roving means 16 includes a spindle means 19 rotatably mounted in a housing 21 fixed to a carriage 21a for movement therewith, a distributor means 22 adjacent to the storage means 13, and a sizing means 23 adjacent thereto whereby a predetermined plurality of insulated electric wires 24 are distributed and separated into an array of the wires by the distributor means 22, sized to a predetermined size by the sizing means 23, and roved by the spindle means 19 which also serves to withdraw the wires from the storage means 13 in response to linear movement of the spindle means 19 in a direction away from the sizing means 23, distributor means 22, and storage means 13. Intermediate of the sizing means 23 and the spindle means 19, is preferably provided a tape winding device, generally designated by the numeral 26, by which a tape 27 is spirally wrapped around the roved wires, indicated at 28, during operation of the machine 10.

In this manner, the harness, generally designated by the numeral 30 in FIGURE 8, wherein a selective plurality of wires which are to be the longest wires in the harness are primarily roved together to form a first roving 28 of a predetermined length by, in a manner to be hereinafter described, gripping the ends 31 of the first selective plurality of wires 24 in gripping means 32 of the spindle means 19 after threading the wires 24 through selective circumferentially spaced apertures 33 of the distributor means 22 and a central aperture of the sizing means 23 and actuating the carriage 21a having the spindle means 19 to move longitudinally along the track 18 of the frame 11, away from the storage means 13 and in the direction of an arrowed line 34, and rotating the spindle means 19 to twist the wires 24 into the first roving 28. Successive breakouts of successively shorter lengths 28a, 28b and 28c are successively added to the roved break-out 28 by repeating the operation in which a successive plurality of wires 24 are similarly threaded through the distributor means 22 and the sizing means 23 and gripped together with the last roving by the gripping means 32 so as to successively rove additional pluralities of wires around the last roved plurality of wires until the harness is built up to the complete cable 30 of an enlarge diameter.

The storage bank 13, as previously described, includes a plurality of stacked tubular elements 14 of suitable length for supporting the wires 24 of predetermined length. For convenience of loading the tubular elements 14, a wire-loading device, generally indicated by the numeral 36, is preferably mounted on an upright member or wall 37 of the frame 11 adjacent to the open ends of the tubular elements 14 whereby the wires 24 may be individually fed lengthwise into the tubes. The wireloading means 36 includes a reel 38 rotatably mounted on the wall 37 and adapted for supporting a spool of the wire 24, the wire 24 being led between a pair of opposed driven rollers 39 which are driven as by a motor 41 to feed the wire 24 through a flexible guide tube 42 into one of the tubular elements 14. The flexible tube 42 is removably securable as at 43 to a tube 14 for directing a wire 24 into a selective tube. The wire 24 is removed from the reel 38 and fed into the tube after being previously identified by numbering or other suitable identification. Air under pressure is preferably supplied into the flexible tube 42 as from a flexible hose 44, or the like, for preventing frictional binding within a tube 14 while the wire 24 is fed therein and for this purpose a solenoid valve 45 and an air regulator 46 are provided in an air supply hose 47 to control the air supply. The wire 24 may be previously cut in predetermined lengths before it is coiled in a spool on the reel 38 or, if desired, a counter (not shown) may be introduced to contact the wire 24 and indicate the length of wire 24 fed into each tube 14.

The wires 24 taken out of the storage bank 13 are fed to the distributor means 22 and guided in transit by flexible tubes 48, similar to the tubes 42, the tubes 48 being securable to the selective tubes 14 by means similar to the securement means 43 and to the apertures 33. In this manner, the wires 24 are distributed in a selective array to guide the wires 24, after which they are fed through the sizing means 23.

A removable and replaceable sleeve 49 is removably secured in a central aperture 51 of distributor block 22 and having a central longitudinal opening 52 through which a previously roved plurality of wires 24 may be supported as previously described for subsequent roving of a subsequent plurality of wires therearound. The sleeve 49 is preferably provided with a flange 53 abutting the outer surface 54 of the distributor means 22 adjacent to the storage bank 13 to limit movement of the sleeve 49 in one direction. A pivoted clamp member 56 is lockable by a cam member 57 to hold the sleeve 49 against lateral movement relative to the distributor means 22 in an opposite direction. As the cable is built up, as previously described, by roving additional wires over a previously roved break-out, the sleeve 49 may be removed and another having a successively larger opening 52 extending therethrough may be installed in its place by releasing the cam 57, pivoting the member 56 and thereby slipping the sleeve 49 out of the aperture 51 of the distributor means. Other sleeves 49, having successively larger openings 52, may be successively replaced therein to accommodate successively larger cores of roved wires, each held in place by the pivoted member 56 which is locked by the cam member 57.

The sizing means 23 is preferably also provided with a removable and replaceable orifice 58 to accommodate a progressively increased cable. For this purpose, an insert 59 is removably secured in a slot 61 of the sizing means 23, and held in place by a removable top plate 60, whereby an insert 59 having an aperture 58 of a different size may be replaced within the block 62 as required. Each orifice 58 is preferably rounded at its opening, as at 63, with a cooperating bevel 64 on the trailing end of the sleeve 49 adjacent thereto, whereby the wires 24 are smoothly fed into the sizing opening 58.

The spindle means 19 comprises a tubular body 66 rotatably mounted in a low friction bearing 67 secured to a wall of the carriage housing 21 for rotation around a longitudinal axis extending through the housing. The gripping means 32 includes a compressible collet 68 comprising an annular compressible sleeve having a longitudinal opening 69 and is formed of a compressible material such as rubber, neoprene, or the like. The annular member 68 resides in a longitudinal bore 71 of the tubular body 66.

A plunger 72, slidingly disposed in the bore 71, is longitudinally extensible and retractable to selectively compress the collet 68 for gripping a plurality of wires 24 extending therethrough or release the collet for expansion. The plunger 72 is selectively driven by spaced air cylinders 73 and 74 which are connected to transverse members 76 of a yoke 77. In response to actuation of the cylinders 73 and 74 to retract their respective piston rods 78, which are in turn connected to the yoke 76—77, the plunger 72 is extended within the tubular member 66 to compress the collet 68 against a backing plate 79 threadedly or otherwise secured to the wall of the housing 21. In this manner, after the selective plurality of wires have been threaded through the distribution means and the sizing means 23, the free ends are placed within the collet 68 and the collet contracted by actuating the cylinders 73 and 74 to extend the plunger 72 inwardly of the sleeve 66. The sleeve 66 is then driven by a drive means, generally designated by the numeral 80, which includes a motor 81 which, as will be hereinafter described, drives a shaft 82 in the predetermined direction, to rotate a bevel gear 83 secured thereto which is meshed with a bevel gear 84 secured to the exterior of the tubular body 66 for rotating the spindle 19.

As best seen in FIGURE 6, the shaft 82 extends transversely, outwardly of the housing 21 and is driven by a sprocket gear 85 secured to the shaft 82 and which has a sprocket chain 86 meshed therewith. The chain 86 extends forwardly, longitudinally, relative to the frame 11, around an idler sprocket gear 87 rotatably mounted on a shaft 88 supported on the frame 11 and downwardly over a pair of idler gears 89 and 91 to encircle a sprocket gear 92 secured to a transverse shaft 93. The shaft 93 is connected through a gear train 94 to a spaced transverse shaft 96 having a sprocket gear 97 secured thereto. The gear 97 is connected by a sprocket chain 98 to a similar gear forming a part of a friction clutch member 99 for selectively connecting the gear chain 98 to be driven through a variable drive unit 101, a shaft 102 extending therefrom, a sprocket gear transmission means 103 and the motor 81 so that the spindle means 19 may be selectively rotated in response to actuation of the friction clutch member 99. The friction clutch member 99 may be manually actuated by an actuator rod 104 extending transversely relative to the frame 11 and having a manual control actuating handle 106 mounted on the control panel 107 of the frame 11.

By this means, the motor 81, actuated as by a start-stop switch 108 on the control panel 107, drives the sprocket chain transmission means 103 and shaft 102, the speed of which is varied as by the variable drive mechanism 101 controlled manually through a control rod 109 extending through the control panel 107 and having a control handle 111. The varied drive is transmitted when the clutch 99 is actuated through the rod 104 and handle 106 to connect the varied drive to the chain 98 and sprocket gear 97 to rotate the shaft 96 which through the gear train 94 rotates the shaft 93 and sprocket gear 92 to rotate the sprocket gear 85 and thereby the shaft 82 and the bevelled gears 83 and 84. In this manner, the spindle 19 is selectively rotated after the free ends of the wires 24 have been gripped by the gripping means 32 in response to actuation of the cylinders 73 and 74 which may receive air under pressure in response to actuation of a control handle or switch designated by the numeral 112 on the control panel 107. A lever 113 is also provided on the control panel 107 for reversing the direction of rotation of the spindle 19. The motor 81 may be of a reversible type so that when actuated by the switch lever 113 or similar means, the drive is reversed to drive the gears 83 and 84 in an opposite direction and thereby the spindle 19 in an opposite direction.

The gear 89 is secured to a transverse shaft 114 for rotating a bevelled gear 116 meshed with a complementary gear 117 rotatably secured in suitable manner to an upstanding portion 120 of the frame 11. The gear 117 has an opening 118 extending longitudinally therethrough through which the roving 28 or subsequent rovings extend. As best seen in FIGURES 4 and 6, the tape winding means 26 is mounted on the gear 117 for rotation therewith and includes a stub shaft 119 on which a spool 121 of tape 27 is rotatably mounted for revolution around the roving 28 extending through the longitudinal opening 118 of the gear 117. In this manner, as the gear 117 is rotated in the manner previously described, through the shaft 114 and the sprocket gear 89, the tape 27, which has been previously attached at the starting point of the roving 28, is spirally wrapped on the roving as the spool 121 revolves therearound.

An additional chain sprocket transmission means 122 is driven by the motor 81 for imparting a linear movement to the carriage housing 21 when a clutch member 123 is selectively actuated. The clutch 123 has an actuating rod 124 extending through to the control panel 107 for manual actuation by a control lever or handle 126. When the clutch is actuated, the transmission gear chain 122 is caused to rotate a shaft 127 and through a gear train 128 rotate a transverse shaft 129. A sprocket gear 131 is secured to the shaft 129 for rotation therewith and has an endless sprocket chain 132 engaged therewith. The chain 132 extends forwardly and longitudinally, relative to the frame 11 to mesh with a sprocket gear 133 rotatably mounted on the transverse shaft 88 and extends upwardly and partially encircles a sprocket gear 134. Suitable idler sprocket gears 136 are provided to hold the chain 132 meshed with the gear 134. The sprocket gear 134 is selectively actuatable to rotate a transverse shaft 137 extending into the housing 21 when locked thereto by a brake 138 which is actuatable by a solenoid device 139. The solenoid 139 is actuatable from the control panel 107 by a switch indicated at 141. Normally the sprocket gear 134 may idle on the shaft 137 but when locked by the brake 138, is locked thereto so that the chain 132 progresses therearound without rotating the gear 134, thereby translating the movement of the chain 132 into a linear movement of the housing 21 to advance the housing and thereby the spindle means 19 in one direction.

The speed at which the housing 21 is traversed relative to the frame 11 may be varied by a variable drive intercepting the motor drive 8 and indicated by the numeral 142 in FIGURE 6 which may be controlled by a control rod 143 extending to the control panel 107 and having a handle 144 thereat. The direction of linear movement of the carriage housing 21 may be determined from the control panel by a direction reverse lever 146. In reverse, the housing 21 is moved in the direction of the broken arrowed line 147 to return the housing 21 to a position adjacent to the upstanding frame 118 for gripping selective plurality of wires for roving thereof.

The carriage housing 21 is traversed on a plurality of rollers 148 rotatably mounted on a depending frame 149 of the housing. The rollers 148 rest on the track 18 and preferably have a pair of counter rollers (not shown) engaging the underside of the track so that the housing 21 may be easily and readily linearly moved in a longitudinal direction relative to the frame 11.

In operation, a first roving 28 is roved as described wherein the ends are gripped by the gripping means 32 of the spindle 19 after being threaded through selective apertures 33 of the distributor means 23 and the longitudinal bore 58 of the sizing means 23 of a size corresponding to the accumulated wires 24. The tape 27 is initially manually wrapped adjacent to the ends secured in the collet 68 of the gripping means 32. The spindle 19 is then actuated to rotate, thereby twisting the wires 24 into a twisted roving 28 while the carriage 21a is actuated to move linearly on the track 18 in a direction away from the storage bank 13 whereby wires are drawn outwardly of the bank, twisted into a roving and wrapped with the tape 27 while the carriage is progressing for a predetermined distance. At the completion of this operation of the distance desired, the roving 28 is removed from the gripping means, sizing means and distributor means and laid into one of the upper and lower storage troughs 151 and 152, respectively, while a subsequent plurality of selective wires 24 are similarly separately roved. When a desired length of the subsequent roving has been accomplished, the first roving is then reinserted in the distributor means, through the sleeve 49 having an opening 52 of appropriate dimension and through the sizing block 23, after which the second selective plurality of wires are roved therearound with the first roving as a core. This operation is successively repeated as required to form subsequent break-outs 28b and 28c until, at the completion, the selective plurality of wires of the last roved break-out 28c are roved around the exterior of the successively built up rovings to form the cable 30 having the tape 27 wound therearound.

A drum 156 is selectively rotatable with the transverse shaft 88 by means of a clutch 157 selectively operable from the control panel 107 by a switch 158. When the clutch 157 is actuated, the rotation of the shaft 88 is translated into a rotation of the drum 156 whereby a cable 159 wrapped therearound draws selective rovings or break-outs like 28 to draw the roving through a sleeving (not shown) to encase each break-out and subsequently the entire cable, if desired.

As successive break-outs are roved and subsequently combined to form the main cable 30, different blocks 59 having suitable openings 58 extending therethrough may be substituted in the sizing means 23 to provide successively larger openings 58 to size the ever-increasing cable 30. Similarly, as successively increasing cores are passed through the opening 52, sleeves 49 having progressively larger openings 52 may be substituted by releasing a sleeve 49 from the pivoted member 56 held by the cam member 57.

While the instant invention has been shown and described herein in what is conceived to be the most practical and preferred embodiment, it is recognized that departures may be made therefrom in the scope of the invention, which is therefore not to be limited to the details disclosed herein but is to be afforded the full scope of the claims.

I claim:

1. An electric harness roving machine comprising: an elongated frame; storage means on one end of said frame for storing a predetermined plurality of wires of predetermined lengths and sizes; distributing means mounted on said frame adjacent to said storage means and having a plurality of circumferentially spaced apertures, each adapted to receive one of a selective plurality of wires therethrough; sizing means on said frame adjacent to said distributing means and having an aperture of predetermined diametrical dimension extending therethrough, said sizing means being adapted to receive collectively therethrough the selective wires extending through said apertures of said distributing means for sizing thereof; spindle means mounted on said frame for reciprocal longitudinal movement relative to said frame; power drive means on said frame and having a driven shaft; first power transmission means connecting said power drive means and said spindle means for selectively moving said spindle means in one direction longitudinally relative to said frame; gripping means on said spindle means for gripping collectively ends of said selective plurality of said wires for longitudinal movement with said spindle means; and second power transmission means connecting said power drive means and said spindle means for translating rotation of said driven shaft of said power drive means into a rotation of said spindle means in one direction for roving the selective wires gripped thereby.

2. An apparatus as defined in claim 1, wherein said gripping means includes an annular resilient compressible member adapted to receive the selective plurality of wires centrally therethrough and means for selectively compressing said annular member so as to grip the selective plurality of wires passing therethrough.

3. An apparatus as defined in claim 1, wherein said driven shaft is driven in one direction for driving said spindle means in one direction relative to said frame so as to draw said selective plurality of wires in one direction relative to said frame and including means for reversing said direction of travel of said spindle so as to return said spindle into a normal position adjacent said sizing means.

4. An apparatus as defined in claim 3, including means for varying the speed of drive of said drive means in each direction.

5. An apparatus as defined in claim 1, including means for reversing the direction of rotation of said spindle means.

6. An apparatus as defined in claim 1, including tape winding means on said frame and adjacent to said sizing means; and third power translating means connecting said tape winding means and said power drive means for actuating said tape winding means so as to wrap a tape around said selective plurality of wires subsequent to passing thereof through said sizing means.

7. An apparatus as defined in claim 1, including means for supporting a priorly roved plurality of wires for roving of a second selective plurality of wires therearound by said spindle means, said support means including means defining an aperture adapted to receive said roved first plurality of wires therethrough while said second selective plurality of wires are threaded through selective apertures of said distributor means, through said sizing means and gripped in said spindle means so as to rove said second plurality of wires around said first roving of said first selective plurality of wires.

8. An apparatus as defined in claim 1, including means for supporting a priorly roved plurality of wires on said frame while a second selective plurality of wires supported by said support means is extended through said distributor means, sizing means and roved therewith by said spindle means and in response to rotation and gripping thereof by said spindle means to form a break-out thereon.

9. An apparatus as defined in claim 1, wherein said storage means includes a plurality of longitudinal tube elements juxtaposed to each other in longitudinal relationship and adapted to receive air under pressure therethrough for reducing friction between the interior of a tube member and a wire stored therein.

10. An apparatus as defined in claim 9, including guide means for guiding each of said wires from first support means to said distributing means, said guide means including a flexible tube member having one end communicating with an open end of a storage tube of said storage means and another end communicating with one of said apertures of said distributing means.

11. A method of roving a harness from a plurality of electrical conductive wires comprising the steps of: roving a selective plurality of the longest of said wires for a predetermined length; and roving successive pluralities of progressively shorter lengths separately for a predetermined length and around a last successive roved plurality of wires to form a roving having break-outs of predetermined lengths.

12. The method as defined in claim 11, including the step of spirally wrapping a tape around each successive roving of selective pluralities of wires.

13. A method for roving a harness from a plurality of electrical conductive wires comprising the steps of roving a selective plurality of the longest of said wires for a predetermined length; roving successive pluralities of progressively shorter lengths of wires around a last successive roved plurality of wires.

14. An apparatus for roving a harness from a plurality of electrical conductive wires, comprising: an elongated frame; storage means on one end of said frame for storing a predetermined plurality of wires of predetermined lengths and sizes; roving means for removing and roving a first selective plurality of wires for a predetermined length; means for supporting the roving of the first selective plurality of wires so as to permit roving of subsequent selective plurality of wires in response to repeated operation of said roving means; means for roving the subsequent selective plurality of wires for a predetermined length; and means for supporting the first and subsequent successively roved selective pluralities of wires so as to successively rove further subsequent selective pluralities of wires for predetermined lengths and for supporting all subsequent rovings so as to rove a subsequent roving around selected pluralities of the roved pluralities for predetermined lengths and around all roved pluralities for a predetermined length so as to produce a unitary roving having all successive roved selective pluralities of wires breaking out therefrom in predetermined lengths.

15. The apparatus as defined in claim 14 characterized by a tape winding means adapted to spirally wrap a tape around each successive roving of selective wire subsequent to the roving thereof.

16. Apparatus for roving a harness from a plurality of electrical conductive wires, comprising: an elongated frame; storage means at one end of said frame for storing a predetermined plurality of wires; means for drawing the wires from said storage means; means for roving a first selected plurality of wires for a predetermined length to form a roved wire bundle; and means for roving subsequent selected pluralities of wires for predetermined lengths separate from said first selected plurality and for roving predetermined lengths of roved pluralities of wires in selected groupings whereby a unitary roving having successive roved pluralities of said wires breaking out therefrom is produced.

References Cited in the file of this patent

UNITED STATES PATENTS

| | | |
|---|---|---|
| 1,956,730 | Reichelt | May 1, 1934 |
| 2,322,903 | Wilkoff | June 29, 1943 |
| 2,926,482 | Hardesty | Mar. 1, 1960 |

FOREIGN PATENTS

| | | |
|---|---|---|
| 847,897 | Great Britain | Sept. 14, 1960 |